(12) United States Patent
Patri (10) Patent No.: US 9,548,875 B2
(45) Date of Patent: Jan. 17, 2017

(54) METHOD FOR THE INTERCHANGE OF DEVICE-SPECIFIC DATA BETWEEN DEVICES AND/OR SYSTEMS OF VARIOUS NETWORK SYSTEMS, AND BUS SYSTEM FOR PERFORMING SAID METHOD

(71) Applicant: SCHNEIDER ELECTRIC AUTOMATION GMBH, Marktheidenfeld (DE)

(72) Inventor: Michael Patri, Aschaffenburg (DE)

(73) Assignee: SCHNEIDER ELECTRIC AUTOMATION GMBH, Marktheidenfeld (DE)

(*) Notice: Subject to any disclaimer, the term of this patent is extended or adjusted under 35 U.S.C. 154(b) by 79 days.

(21) Appl. No.: 14/650,639

(22) PCT Filed: Dec. 11, 2013

(86) PCT No.: PCT/EP2013/076206
§ 371 (c)(1),
(2) Date: Jun. 24, 2015

(87) PCT Pub. No.: WO2014/090866
PCT Pub. Date: Jun. 19, 2014

(65) Prior Publication Data
US 2015/0333931 A1    Nov. 19, 2015

(30) Foreign Application Priority Data
Dec. 13, 2012   (DE) ................ 10 2012 112 225

(51) Int. Cl.
*H04L 12/66*     (2006.01)
*H04L 12/40*     (2006.01)
(Continued)

(52) U.S. Cl.
CPC ........... *H04L 12/66* (2013.01); *G05B 19/4185* (2013.01); *H04L 12/462* (2013.01);
(Continued)

(58) Field of Classification Search
CPC ................ H04L 12/66; H04L 69/08; H04L 12/40–12/407; G05B 19/4185–19/4186
See application file for complete search history.

(56) References Cited

U.S. PATENT DOCUMENTS

2012/0311181 A1* 12/2012 Smith .................. H04L 12/403
                                                    709/238
2014/0121785 A1*  5/2014 Ismail .............. H04L 12/40032
                                                    700/3

(Continued)

OTHER PUBLICATIONS

Peter Neumann et al.: "Architectural Concept of Virtual Automation Networks", Jul. 11, 2008, Retrieved from Internet: URL: http://dx.doi.org/10.3182/20080706-5.

(Continued)

*Primary Examiner* — Marcus R Smith
(74) *Attorney, Agent, or Firm* — Ladas & Parry LLP (57) ABSTRACT

The invention relates to a method and a bus system for the interchange of device-specific data between fieldbus slaves of a first fieldbus and a fieldbus master of a second fieldbus, wherein the first fieldbus is connected for communication to a common Ethernet network via a first gateway and the second fieldbus is connected for communication to a common Ethernet network via a second gateway, wherein the communication via the Ethernet network occurs according to the client-server communication principle, wherein the first gateway reacts on the network side as a fieldbus master and on the Ethernet side as a web service server, and wherein the second gateway reacts on the fieldbus side as a fieldbus slave and on the Ethernet side as a web service client.

9 Claims, 8 Drawing Sheets

(51) Int. Cl.
G05B 19/418 (2006.01)
H04L 12/46 (2006.01)
(52) U.S. Cl.
CPC .............. *H04L 12/4633* (2013.01); *G05B 2219/25006* (2013.01); *G05B 2219/31186* (2013.01); *G05B 2219/31348* (2013.01); *G05B 2219/31369* (2013.01); *H04L 12/40006* (2013.01); *H04L 2012/40208* (2013.01); *Y02P 90/18* (2015.11); *Y02P 90/185* (2015.11)

(56) References Cited

U.S. PATENT DOCUMENTS

2014/0188933 A1* 7/2014 Chomik ............... H04L 67/125
707/770
2014/0280520 A1* 9/2014 Baier .................... H04L 67/02
709/203

OTHER PUBLICATIONS

Hermann Himmelbauer: "SOAP Interface for an Internet/ Fieldbus Gateway", Sep. 7, 2006, Retrieved from the Internet: URL:http://violin,qwer.tk/dusty/thesis/soap_ip_inet-fan.pdf.

Ralf Messerschmidt et al.: "Integrated Web Services and Tunneling enabling Field Bus Communication via Heterogeneous (Wide Area) Networks", Industrial Informatics, 2010 8th IEEE International Conference on, IEEE, Piscataway, NJ, USA, Jul. 13, 2010, pp. 543-548.

International Search Report mailed on Mar. 12, 2014, corresponding to International Patent Application PCT/EP2013/076206.

* cited by examiner

METHOD FOR THE INTERCHANGE OF DEVICE-SPECIFIC DATA BETWEEN DEVICES AND/OR SYSTEMS OF VARIOUS NETWORK SYSTEMS, AND BUS SYSTEM FOR PERFORMING SAID METHOD

This application is a 371 of PCT/EP2013/076206, filed on Dec. 11, 2013, which claims priority to German Application No. 102012112225.3, filed Dec. 13, 2012.

Immediately following the Claims, insert the Abstract of the Disclosure that appears on the following page.

The invention relates to a method for the interchange of device-specific data between fieldbus slaves of a first fieldbus and a fieldbus master of a second fieldbus, wherein the first fieldbus is connected for communication via a first gateway to a common Ethernet network and the second fieldbus is connected for communication via a second gateway to a common Ethernet network, wherein the communication via the Ethernet network occurs according to the client-server communication principle, wherein the first gateway reacts on the network side as a fieldbus master and on the Ethernet side as a web service server, and wherein the second gateway reacts on the fieldbus side as a fieldbus slave and on the Ethernet side as a web service client, wherein the communication between the first gateway and the second gateway occurs via a web service protocol, wherein a fieldbus message transmitted the fieldbus master of the second fieldbus to the second gateway is transformed in the second gateway into a web service message, and wherein the web service message is transmitted via the Ethernet network and received by the first gateway and transformed into a fieldbus message of the first fieldbus and transmitted to the fieldbus slave.

The invention further relates to a bus system for exchanging device-specific data between fieldbus slaves of a first fieldbus and at least one fieldbus master of a second fieldbus, wherein the first fieldbus is connected via a first gateway and the second fieldbus is connected via a second gateway to a common Ethernet network, wherein the first gateway, which is connected to the fieldbus slaves, is designed on the fieldbus side as a fieldbus master and on the Ethernet side as a web service server, wherein the second gateway, which is connected to the fieldbus master, is designed on the fieldbus side as fieldbus slave and on the Ethernet side as web service client, wherein each of the gateways comprises a data transformation module for the transformation of the received fieldbus messages into web service messages and for the transformation of received web service messages into fieldbus messages, for the implementation of the method.

A method of the type mentioned in the introduction as well as a bus system for carrying out the method is described in US 2002/0016815 A1. The latter relates to a communication system for automation devices via a TCP/IP network. The automation devices control an automation application for executing a user program. The communication system comprises at least one receiving web function block which is integrated in the user program, in order to implement a web server function and/or at least one transmitting web function block, which is integrated in the user program, in order to implement a web client function and an HTTP interface, which is suitable for routing messages between the TCP/IP network and the web function blocks that are identified by a URL address. The content of an HTTP query can comprise an XML frame or a URL-coded frame.

Serial fieldbuses are based on communication principles that are available in various protocol implementations such as Modbus, Profibus or DeviceNet. Most fieldbuses use the master-slave principle, wherein a master device queries data from one or more slave devices, in that the master device transmits a query (request) to which the slave devices react with an answer (response).

A method of the type mentioned in the introduction is known from DE 10 2008 039 697 A1. Here a higher-level unit of a first network system is connected for communication via an HSE server (HSE: High Speed Ethernet) via a high speed Ethernet connection to a gateway and/or to a linking device of a second network system. The gateway and/or the linking device is/are connected or connectable to a fieldbus system. Data communicated between the HSE server and the gateway or linking device via the high speed Ethernet connection is here stored at least partially in a database.

In the case of known serial fieldbus systems, a direct connection exists between the master device and the slave devices. DE 10 2009 027 697 A1 relates to a system for controlling and/or monitoring a process installation in the automation technology with a higher-level control unit and with at least one Ethernet-capable field device, wherein the control unit and the field device are connected to one another via an Ethernet connection on which the Ethernet protocol runs. The control unit is associated with an operation software module, which is used both for operation via a fieldbus of the process automation technology by means of a fieldbus protocol and also for operation via Ethernet by means of the Ethernet protocol. Furthermore, a communication interface is associated with the field device, which reproduces the corresponding fieldbus protocol onto the Ethernet protocol, so that the control unit communicates directly via the Ethernet connection with the field device.

In this embodiment, the tunneling of the fieldbus protocol, for example, of the HART protocol, occurs in the Ethernet protocol, i.e., the Ethernet protocol is used as container for the transmission of the fieldbus protocol.

On the basis of this, the present invention is based on the problem of further developing a method of the type mentioned in the introduction, so that the transmission of data between spatially separated fieldbuses is accelerated, in particular so that the data volume of the data to be transmitted is reduced.

The problem is solved according to the invention in that, among other features, the fieldbus slaves and the data thereof are configured in a database of the web server client, in that the web server client transmits a list of necessary data to the web service server, and in that the web service server cyclically extracts the necessary data from the fieldbus slaves and returns only changes in data values to the web service client, wherein the database is updated in the web service client on the basis of the changed data values.

For the interchange of serial data, it is preferable to use web service telegrams. The transmission occurs by means of tunneling or the conversion of the serial fieldbus protocol into a web service protocol and vice versa.

The gateway connected with the higher-level unit is designed on the fieldbus side as a fieldbus slave and on the Ethernet side as a web service client, while the gateway which is connected to the lower-level units of the first fieldbus system is designed on the fieldbus side as a fieldbus master and on the Ethernet side as a web servicer server.

In other words: in the first gateway, fieldbus slave and web service client functionalities are implemented, and, in the second gateway, fieldbus master and web service server functionalities are implemented.

In the web service client, a storage element is implemented, in which a). configuration data of the fieldbus slaves and necessary data such as device data as well as b). the current values of the necessary data are stored.

It is preferable that only read accesses occur via the storage element (database). Storage accesses occur via an explicit request.

For this purpose, eventing mechanisms are implemented in the web service server and in the web service client, in order to interchange the current values, stored in the storage element, of the data of the field device slaves.

According to a particularly preferable embodiment, it is provided that the web service server queries the field device slaves for these data values (polling) and transmits data changes by means of the eventing mechanism to the web server client, wherein the data in the storage is updated and wherein the current values of the data can be queried via the fieldbus master of the second network system directly in the database of the web server client, without any connection to the fieldbus slave of the first network system existing.

In comparison to the prior art, the advantage achieved is that, owing to the division of the data interchange mechanism into a "standard data" and an "extraordinary data" transmitting mechanism, a master query is answered immediately with the most recent data available (Standard Data Interchange), without again requesting the data and/or requesting additional data not contained in the query loop (polling loop). However, by means of the "extraordinary data" transmission mechanism, a fieldbus master is also in a position to read each fieldbus slave parameter, even if it is not stored in the database, or to describe each fieldbus slave parameter, depending on the access authorization.

An additional advantage is that the fieldbus master and the fieldbus slaves do not have to be contained within the same fieldbus section. Instead, they can be divided over another medium which is used in order to transmit the corresponding data embedded in the web service message. The fieldbus master and the fieldbus slave do not have to be connected using the same fieldbus technology.

Consequently, based on the given infrastructure, distances of the fieldbus system can be increased and are consequently not limited to a physical limit of the respective fieldbus.

The "timings" of the connected fieldbuses are complied with, for example, configured time-out values. In case of real-time applications, the method according to the invention can be used as a function of the latency time that is necessary for the data interchange via the web service tunnel. This depends on the physical layer and the implementation of the communication.

In order to allow a user to communicate via an Intranet or even via the Internet, an authorization and authentication are necessary.

The method according to the invention allows the integration of web services in a lower communication level of industrial automation.

Moreover, the invention relates to a bus system for the interchange of device-specific data between fieldbus slaves of a first fieldbus and at least one fieldbus master of a second fieldbus, wherein the first fieldbus is connected via a first gateway and the second fieldbus is connected via a second gateway to a common Ethernet network, wherein the first gateway, which is connected to the fieldbus slaves, is designed on the fieldbus side as a fieldbus master and on the Ethernet side as a web service server, wherein the second gateway, which is connected to the fieldbus master, is designed on the fieldbus side as fieldbus slave and on the Ethernet side as a web service client, wherein each of the gateways comprises a data transformation module for the transformation of the received fieldbus messages into web service messages and for the transformation of the received web service messages into fieldbus messages. The system is characterized in that the web service client comprises a database in which configuration data and necessary data of the fieldbus slaves as well as current data values of the necessary data are stored.

Additional details, advantages and features of the invention result not only from the claims and from the features that can be obtained therefrom—separately and/or in combination—, but also from the following description of a preferred embodiment example which can be obtained from the figures.

Figure 1:
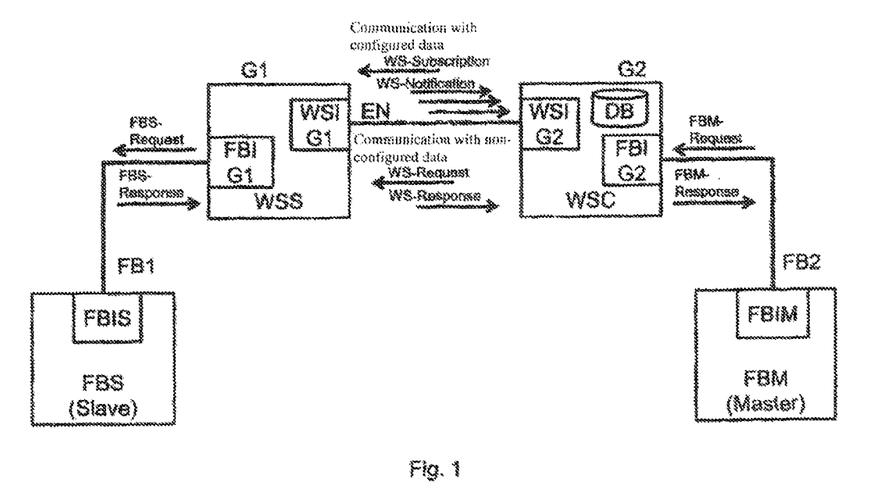
FIG. 1 shows a diagrammatic representation of a fieldbus system with at least two fieldbuses, which are each connected via a gateway to an Ethernet.

FIG. 1 shows purely diagrammatically a fieldbus system FBS, comprising a first network system such as fieldbus FB1, and a second network system such as fieldbus FB2, wherein the fieldbuses FB1, FB2 are each connected via a gateway G1, G2 to a common Ethernet network EN. The first fieldbus FB1 comprises at least one fieldbus slave FBS, which is connected via a fieldbus interface FBIS to the first fieldbus FB1, as well as the gateway G1 designed as a web service server WSS which is connected via a fieldbus interface FBIG1 to the first fieldbus FB1. Furthermore, the web service server WSS is connected via a web service interface WSI to the Ethernet network EN.

The second fieldbus FB2 comprises at least one fieldbus master FBM, which is connected via a fieldbus interface FBIM to the second fieldbus FB2, as well as the second gateway G2, which is connected via a fieldbus interface FBIG2 to the first fieldbus FB2, and which is connected via a web service interface WSI as a web service client WSC to the Ethernet network EN.

Figure 2:
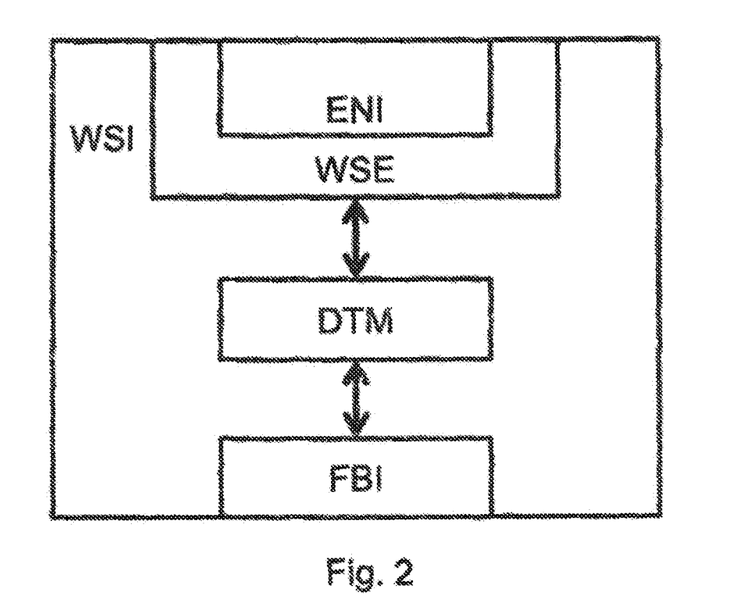
FIG. 2 shows a diagrammatic representation of a first gateway as a web service server.
Figure 3:
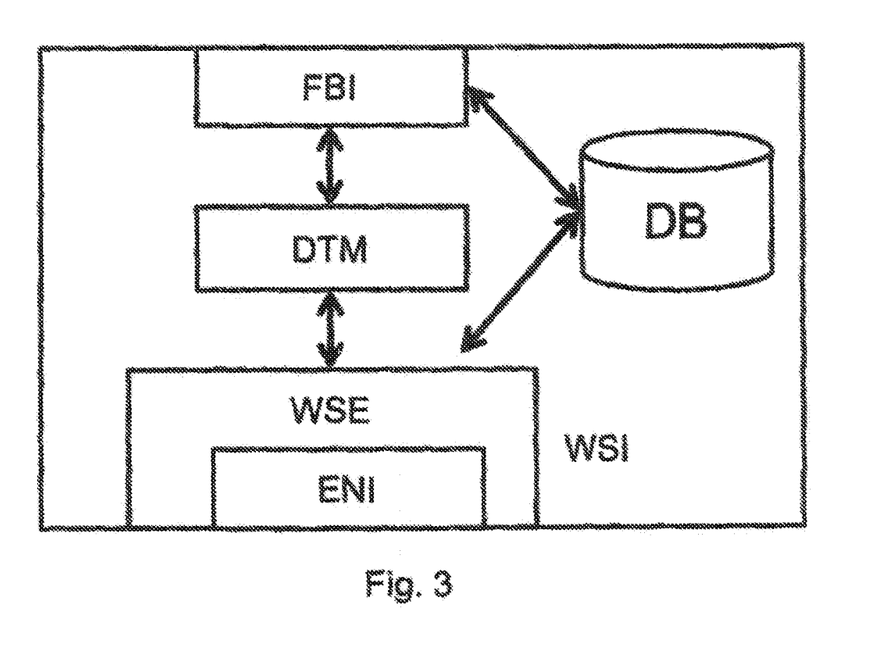
FIG. 3 shows a diagrammatic representation of a second gateway as a web service client.

FIGS. 2 and 3 show purely diagrammatically the structure of the gateways G1, G2 which are used for the rapid interchange of serial fieldbus data by means of web service technology. For such a data interchange of fieldbus data, according to the invention, only two gateways G1, G2 are required, wherein, in the first gateway G1, a web service server functionality and a fieldbus master functionality are implemented, and in the second gateway G2, a web service client functionality and a fieldbus slave functionality are implemented.

FIG. 2 shows the structure of the gateway G1, which comprises a fieldbus interface FBIG1, a data transformation module DTM as well as the web service interface WSIG1. In the present embodiment example, the web service interface WSIG1 comprises an Ethernet interface ENI as well as a web service endpoint WSEG1. The gateway G1, as a web service server WSS, is used for the connection to the at least one fieldbus slave FBS. The web service queries received by the web service server WSS via the Ethernet network EN, such as WS subscription WS-SUB or WS request WS-REQ, are transformed in the data transformation module DTM into a corresponding fieldbus query such as FBS request FBS-REQ and are transmitted to the corresponding fieldbus slave FBS. The corresponding fieldbus answer such as FBS response FBS-RES is received by the fieldbus interface FBIG1, transformed in the data transformation module DTM into the corresponding web service answer such as WS notification WS-NOT or WS response WS-RES and returned to the querying web service client WSC.

FIG. 3 shows purely diagrammatically the structure of the gateway G2 as a web service client WSC. The web service interface WSI comprises an Ethernet interface ENI as well as a web service endpoint WSE which is connected via a data transformation module DTM to the fieldbus interface FBI. Both the web service endpoint WSE and also the fieldbus interface FBI have access to a database DB. The fieldbus messages can be transformed internally into corresponding web service messages. If the data requested by the fieldbus master is already available in the database DB, it is possible to answer the fieldbus query immediately.

In the database DB of the web service client WSC, data of the fieldbus slaves is stored. Furthermore, a configuration is provided indicating which data usually has to be interchanged between the fieldbus master FBM and the fieldbus slave FBS and how the access to this data is authorized. The web service client WSC informs the web service server WSS indicating that said web service server is interested in any kind of changes of data of the database DB. This occurs by transmitting a web service subscription message WS-SUB by the web service client WSC.

The order (subscription) is confirmed by the web service server WSS, if it can be carried out successfully. The web service server WSS requests the corresponding data from the fieldbus slaves FBS connected to the fieldbus FB1 continuously by transmitting a fieldbus query FBS request FBS-REQ to the fieldbus slaves FBS. The fieldbus slaves FBS return a fieldbus answer FBS response FBS-RES to the web service server.

If some of the data ordered change in the meantime, the web service server WSS will inform the web service client WSC on the changes by transmitting a web service notification message WS-NOT via the web service interface WSIG1. Consequently, the web service client WSC is informed of any data change and always has available the most recent data values in the database DB.

If the fieldbus master FBM connected to the fieldbus FB2 transmits a fieldbus query FBM request FBM-REQ to the web service client WSC via the fieldbus interface FBIM, in order to request data of the fieldbus slaves, the web service client WSC can immediately extract the current data from the database DB, without requesting it again, and return said current data to the fieldbus master FBM by means of a fieldbus answer FBM response FBM-RES via the fieldbus interface FBI.

Below, a data interchange is described which is initiated by the fieldbus master FBM and wherein necessary data is not contained in the database DB.

The fieldbus master FBM, which is connected to the second fieldbus FB2, transmits a fieldbus query FBM request FBM-REQ via the fieldbus interface FBIM. Said request is read by the fieldbus interface FBIG2 of the web service client WSC and transformed by means of the data transformation module DTM into a corresponding web service request message WS-REQ. After the reception of the web service message WS-REQ by the web service server WSS, the web service message is transformed again by means of the data transformation module DTM into the corresponding fieldbus query FBS request FB-REQ and transmitted to the fieldbus slave FBS.

The fieldbus slave FBS processes the query and transmits back a fieldbus answer FBS response FBS-RES. The web service server WSS transforms the received fieldbus answer FBS-RES into a web service response message WS-RES and transmits said message via the web service interface to the web service client WSC, which again transforms the message into a corresponding fieldbus answer FBM response FBM-RES and forwards said response to the fieldbus master FBM, which awaits the response. This communication mechanism is also used for transmitting commands to the fieldbus slave FBS.

Consequently, the web service client WSC has a slave functionality on the fieldbus side and a client functionality on the web service side. Accordingly, the web service server WSS is provided with a master functionality on the fieldbus side and with a server functionality on the web service side.

Due to the fact that the web service server WSS requires fieldbus master functionality, this functionality must be either in the existing fieldbus master FBM of the first fieldbus FB1, in which only single masters are supported by the fieldbus technology, or in any existing or newly addable field device in the case of systems in which multiple masters are allowed by the fieldbus technology such as CAN, for example, in order to enable the interchange of data via web services during the run time.

In order to connect the web service server WSS to a fieldbus slave FBS, which is not controlled by any fieldbus master FBM at the time of access, the locating of the web service functionality of the web service server is independent of the fieldbus technology.

The aim of the invention is the interchange of data between fieldbus slaves and corresponding diagnostic systems, for example, in order to display measured values for a user.

Figure 4:
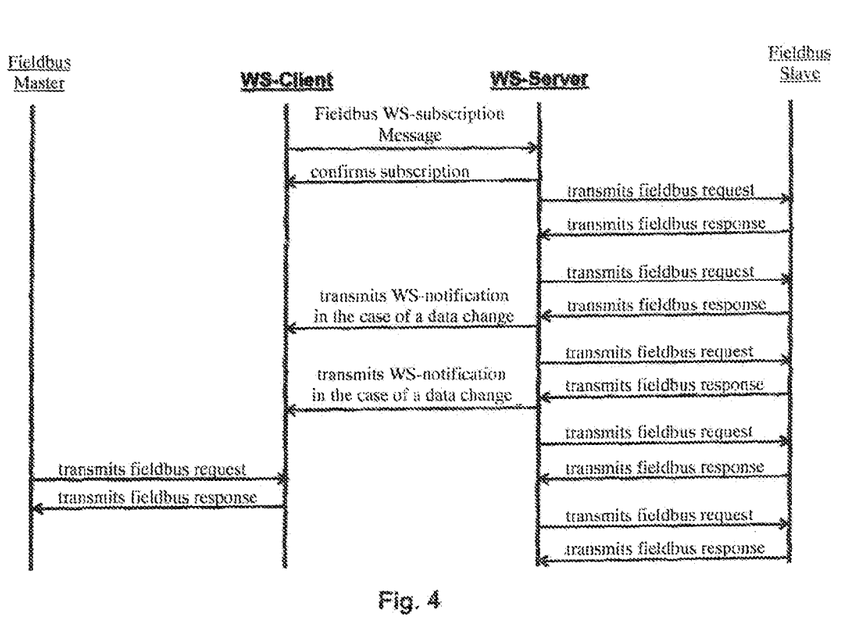
FIG. 4 shows a diagrammatic representation of a first communication sequence between fieldbus master and fieldbus slave with querying for data changes of the fieldbus slaves by the web service server.

FIG. 4 shows, as an example, a sequence of a data interchange with data updating and database querying, using web service data interchange principles. The web service client WSC subscribes to corresponding data from the fieldbus slave FBS by transmitting a web service subscription message WS-SUB, which is confirmed by the web service server WSS by means of an acknowledgment message ACK-SUB. In the case of a successful order, the web service server WSS periodically requests the corresponding data from the fieldbus slave FBS via corresponding fieldbus queries FBS request FBS-REQ.

If the data has changed since the last querying, the web service server WSS transmits a web service notification message WS-NOT to the web service client WSC including the changed data. The web service client WSC updates the data in the database with the data received. In this manner, the web service client WSC is informed at any time of the most recent changes. If the fieldbus master FBM transmits a fieldbus query FBM request FBM-REQ to the web service client WSC, the web service client WSC can answer the fieldbus query FBM request FBM-REQ immediately using the data from the database DB, without the data having to be requested again from the fieldbus slave FBS.

Figure 5:
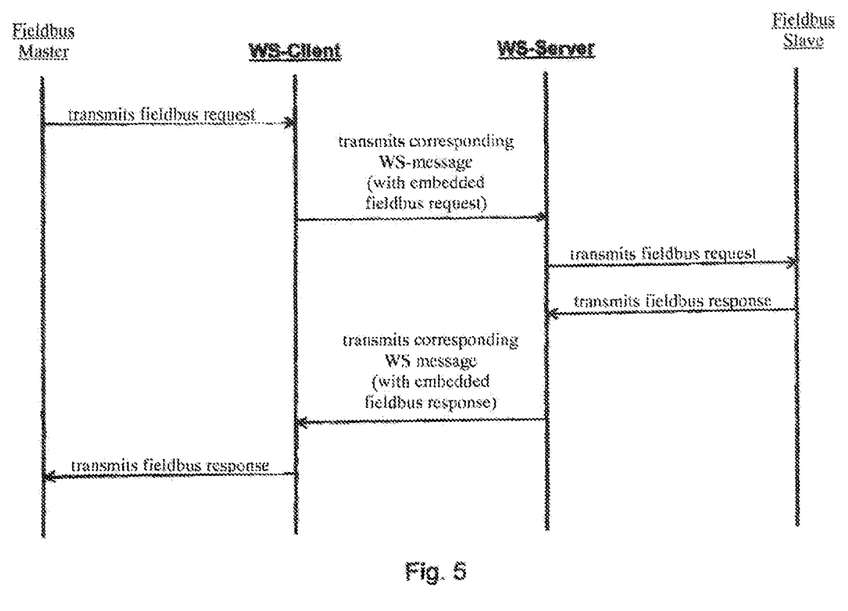
FIG. 5 shows a diagrammatic representation of a second communication sequence concerning a direct communication between fieldbus master and fieldbus slave.

FIG. 5 shows a sequence of a data interchange of unconfigured data, which means that the data is not present in the database DB of the web service client WSC. There may be two reasons why the data are not present: either the data in the database DB is not configured or the data is configured but has not yet been read by the fieldbus slave FBS.

If a query FBM request FBM-REQ originating from the fieldbus master FBM is received by the web service client WSC and the data is not present in the database DB of the web service client WSC, the web service client WSC initiates a corresponding web service message and transmits said message to the web service server WSS, which transforms said message into a corresponding fieldbus message of the fieldbus slave FBS. This fieldbus query is transmitted to the fieldbus slave FBS, which transmits the necessary data to the web service server WSS as a response. The web service server WSS generates from this fieldbus data a web service message, which is returned to the web service client WSC in order to return the fieldbus data to the fieldbus master FBM.

Figure 6:
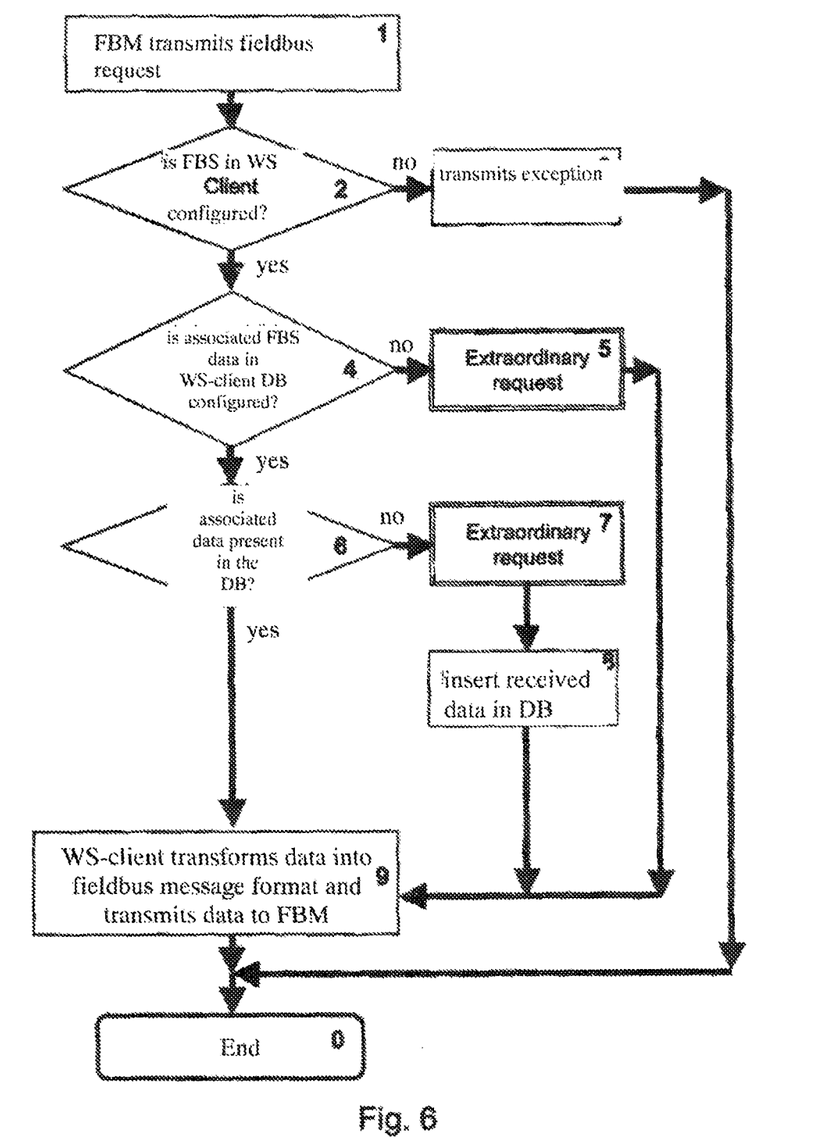
FIG. 6 shows a diagrammatic flow chart of a data interchange sequence after transmitting a fieldbus master request, FIGS. 7a, b show a diagrammatic flow chart of process steps of a data interchange sequence with database updating and database querying.
Figure 7A:
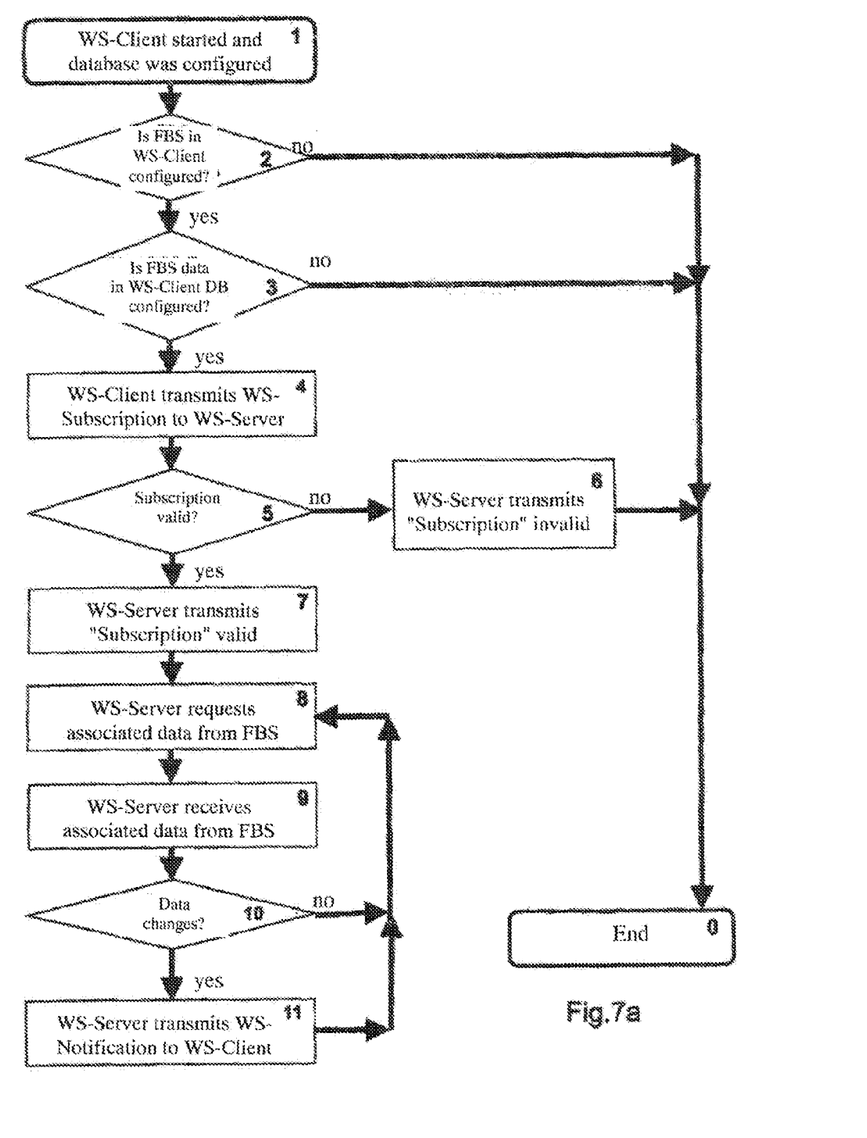
Figure 7B:
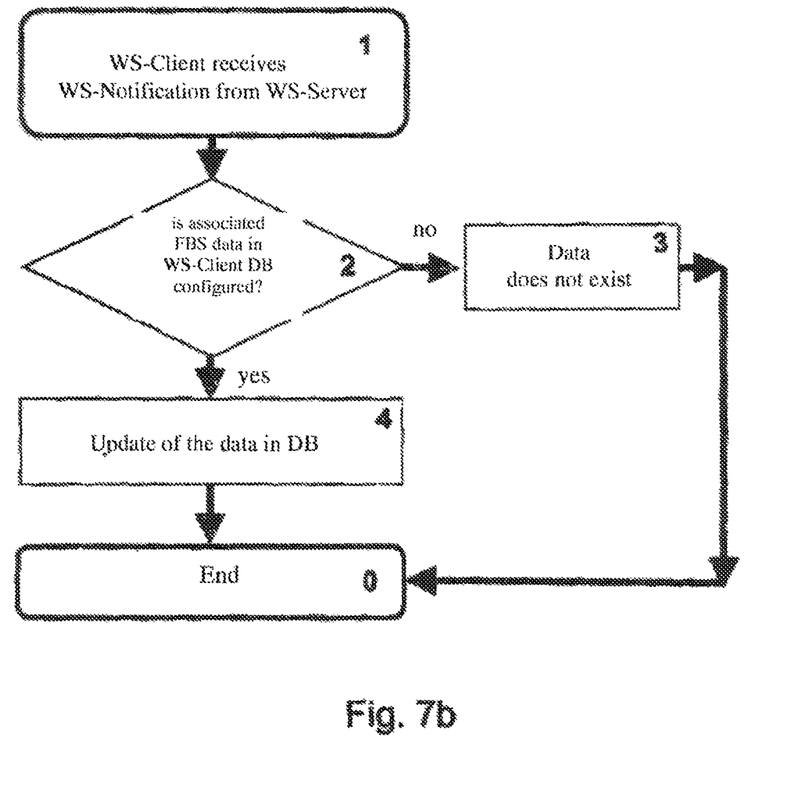
Figure 8:
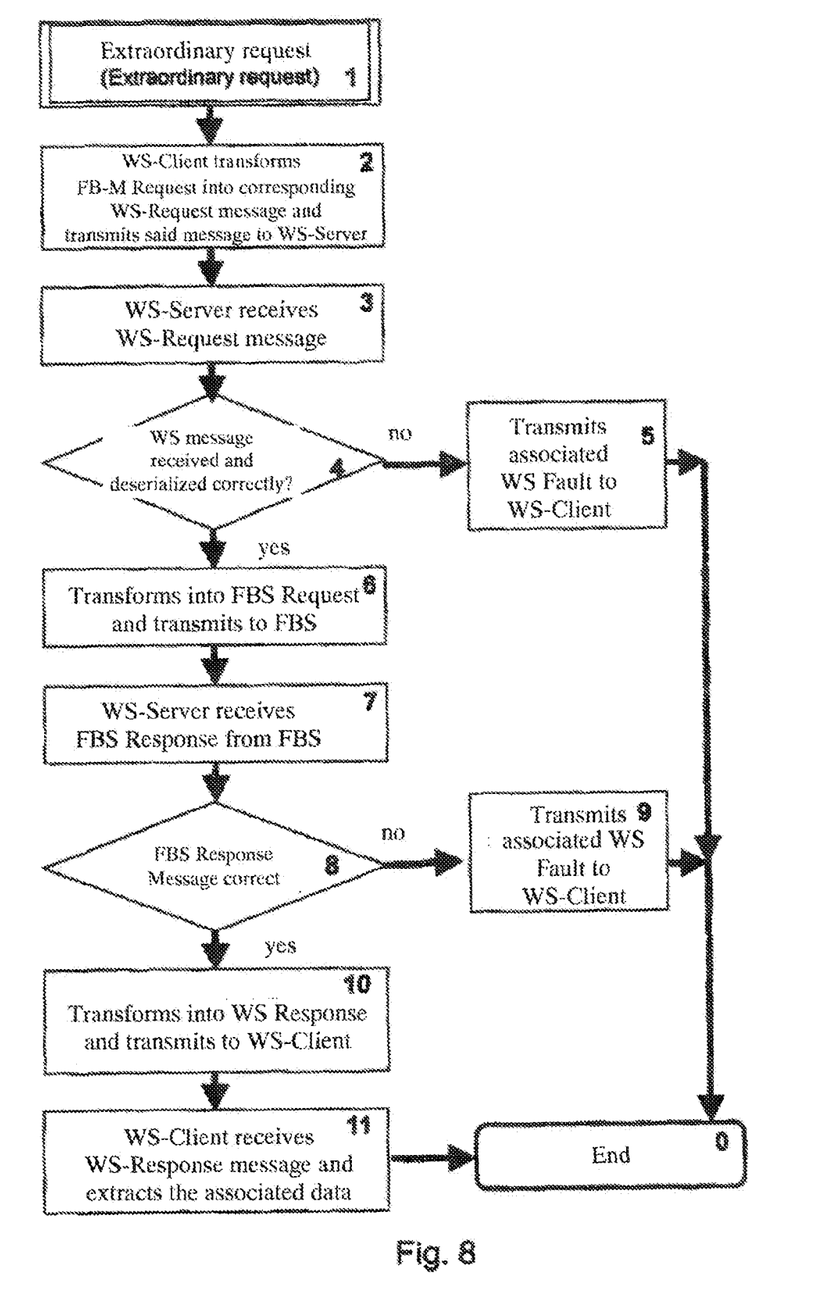
FIG. 8 shows a diagrammatic flow chart of a data interchange sequence without database querying.

FIGS. 6 to 8 show flow charts of the data interchange for the respective data interchange mechanisms.

FIG. 6 shows a flow chart of a data interchange sequence. In a first process step S1, the fieldbus master FBM transmits a fieldbus query FBM-REQ concerning data of a fieldbus slave FBS. In a second process step S2, a verification is carried out first to determine whether the queried fieldbus slave FBS in the database DB of the web service client WSC is configured. If the fieldbus slave FBS is not configured, an "exception" message is returned to the fieldbus master FBM in process step S3.

Moreover, in process step S4, the web service client WSC verifies whether the queried data is configured in the database DB. If the data of the fieldbus slave FBS is not configured, a request for a data interchange is generated in process step S5.

In the case where the data of the fieldbus slave FBS is configured in the database DB, it is verified subsequently, in process step S6, whether the requested data is also available in the database DB. If the data is not available in the database DB of the web service client WSC, a request for the data interchange of unconfigured data is carried out in process step S7, wherein, in contrast to process step S5, the data requested from the fieldbus slave is inserted into the database DB (process step S8).

If the data is already present in the database DB, the web service client WSC can immediately extract said data from the database DB and transform it into corresponding field messages and transmit it to the fieldbus master FBM (process step S9).

FIG. 7a shows a flow chart of the data interchange sequence for configured data. In a first process step S1, the web service client WSC is started and the database DB is configured.

In process step S2, it is verified whether the fieldbus FBS in the database DB of the web service client WSC is configured. In the affirmative case, in process step S3, an internal verification occurs to determine whether any data exists that was configured relative to the configured fieldbus slave. If the content includes no configured data, each fieldbus master request FBM-REQ must be responded to using the "extraordinary data" data interchange mechanism, and the "standard data" data interchange mechanism cannot be used.

If, in the database DB of the web service client WSC, data of a fieldbus slave is configured, the web service client WSC transmits the corresponding message WS subscription WS-SUB to the web service server WSS (process step S4). The web service server WSS verifies whether the message WS subscription WS-SUB is valid (process step S5). Subsequently the web service server WSS returns a response and informs the web service client WSC on the validity or lack of validity of the order (subscription) (process steps S6 and S7).

If the subscription can be carried out, the web service server WSS starts a query of the fieldbus slaves FBS and queries the requested data from the fieldbus slave in process step S8. After receiving the response of the fieldbus slave in process step S9, the web service server WSS, in process step S10, verifies whether the data has changed since the last request. If the data has not changed, the web service server WSS requests the data again using a configured query period in process step S8. If the data has changed, the web service server WSS transmits a message WS notification WS-NOT to the web service client WSC and informs the web service client about the change, and the web service client again updates the data in its database DB (process step S11).

FIG. 7a shows a second part of the "standard data" data interchange sequence. FIG. 7b shows the counterpart of the variant of the "standard data" data interchange according to FIG. 7a. After receiving a message WS notification WS-NOT from the web service server WSS in process step S1, the web service client WSC, in process step S2, verifies whether the data received is configured in the database DB. If this is not the case, the data is set aside/discarded in process step S3. Otherwise, the data received is updated in the database DB in process step S4 for a possible request by fieldbus master FBM.

FIG. 8 shows purely diagrammatically a flow chart of an "extraordinary data" data interchange sequence. If all the prerequisites for an "extraordinary data" data interchange have been met in process step S1 according to the flow chart in FIG. 6, then the sequence starts in process step S2. In process step S2, the web service client WSC transforms the received fieldbus query of the fieldbus master FBM into the corresponding message WS request WS-REQ and transmits said message to the web service server WSS.

The web service server WSS receives the message WS-REQ in process step S3 and verifies whether said message can be subjected appropriately to a serial-parallel conversion (deserialized) and received (process step S4). Subsequently, the web service server WSS transmits a corresponding message WS fault in process step S5 to the web service client WSC, or otherwise the web service server transforms the message WS request WS-REQ into a fieldbus query and transmits said fieldbus query to the fieldbus slave FBS in process step S6.

The fieldbus slave FBS processes the query and returns the response to the web service server WSS in process step S7, which again verifies, in process step S8, whether the fieldbus response is faulty. In this case, a corresponding message WS fault is also transmitted to the web service client WSC in process step S9.

The web service server WSS transforms the fieldbus response again into a message WS-RES and transmits said message to the web service client WSC in process step S10. The web service client WSC receives the message WS response WS-RES and extracts the corresponding data in process step S11.

The invention claimed is:

1. A method for the interchange of device-specific data between fieldbus slaves of a first fieldbus and a fieldbus device of a second fieldbus, the method comprising:
   connecting the first fieldbus for a communication via a first gateway to a common Ethernet network;
   connecting the second fieldbus for a communication via a second gateway to the common Ethernet network;

wherein the communication via the Ethernet network occurs according to the client server communication principle;

wherein the communication between the first gateway and the second gateway occurs via a web service protocol, wherein a fieldbus message transmitted by the fieldbus device of the second fieldbus to the second gateway is transformed in the second gateway into a web service message, and wherein the web service message is transmitted via the Ethernet network and received by the first gateway and transformed into a fieldbus message of the first fieldbus and transmitted to at least one of the fieldbus devices;

wherein the first gateway is designed on the fieldbus side as a fieldbus master for the fieldbus devices of the first fieldbus, which are designed as fieldbus slaves, and reacts on the Ethernet side as a web service server, and wherein the second gateway is designed on the fieldbus side as a fieldbus slave for the at least one fieldbus device of the second fieldbus, which is designed as a fieldbus master, and reacts on the Ethernet side as a web service client;

wherein the fieldbus slaves of the first fieldbus and the data thereof are configured and stored in a database, wherein the database is implemented in a web service client of the second gateway, which is connected to the fieldbus master of the second fieldbus;

wherein the web service client of the second gateway transmits a list of data necessary to the fieldbus master to the web service server of the first gateway;

wherein the web service server of the first gateway, as fieldbus master, cyclically extracts the necessary data from the fieldbus slaves and returns only changes of data values to the web service client, wherein both the web service server and also the web service client comprise an eventing mechanism for the interchange of the current data values of the configured fieldbus slave data;

wherein the fieldbus slave data of the database are updated in the web service client on the basis of the change data values; and wherein the web service client responds immediately to a query of the fieldbus master with the current data from the database.

2. The method according to claim 1, wherein a polling method is used for querying the fieldbus slaves.

3. The method according to claim 1, wherein, between the web service server and the web service client, data changes are transmitted and in that only changed data are updated and stored in the database.

4. The method according to claim 1, wherein, if the database has not configured any data of the fieldbus slaves and/or contains no necessary data values, a fieldbus query of the fieldbus master is transformed in the web service client into a web service request message, in that the web service request message is transformed in the web service server into a fieldbus query, in order to request corresponding data from the fieldbus slaves and return said data to the fieldbus master.

5. The method according to claim 1, wherein a SOAP protocol is used as web service protocol.

6. The method according to claim 1, wherein a fieldbus message is embedded in the web service protocol or translated into said web service protocol.

7. A bus system for the interchange of device-specific data between fieldbus devices of a first fieldbus and at least one fieldbus device of a second fieldbus, the system comprising:

the first fieldbus connected via a first gateway to a common Ethernet network; and the second fieldbus connected via a second gateway to the common Ethernet network;

wherein each one of the gateways comprises a data transformation module for the transformation of the received fieldbus messages into web service messages and for the transformation of received web service messages into fieldbus messages;

wherein the first gateway connected to the fieldbus slaves is designed on the fieldbus side as a fieldbus master for the fieldbus devices designed as fieldbus slaves and on the Ethernet side as a web service server, in that the second gateway connected to the fieldbus master is designed on the fieldbus side as a fieldbus slave for the fieldbus device of the second fieldbus, which is designed as a fieldbus master, and on the Ethernet side as a web service client;

wherein the web service client connected to the fieldbus master via the second fieldbus comprises a database, in which configuration data and data of the fieldbus slaves of the first fieldbus, necessary to the fieldbus master, as well as current data values of the necessary data are stored; and wherein, in the web service server and in the web service client, eventing mechanisms are implemented in each case for the interchange of the current data values of the configuration data as well as of the necessary data of the fieldbus slaves.

8. A fieldbus system according to claim 7, wherein the web service server functionality is implemented in a fieldbus master of the first fieldbus, if the fieldbus technology of the fieldbus supports only single-master and/or in that the web service server functionality is implemented in the fieldbus devices or fieldbus systems that have master functionality in which multi-master is allowed by the fieldbus technology such as CAN technology, for example.

9. The fieldbus system according to claim 7, wherein the web service server functionality is implemented in a fieldbus slave of the first fieldbus, wherein this web service server supports only this one fieldbus slave explicitly.

* * * * *